United States Patent

[11] 3,621,870

[72] Inventors Micha Harchol
Kibbutz Kineret;
Nachman Pundak, Kibbutz Ein-Harod,
both of Israel
[21] Appl. No. 59,887
[22] Filed July 31, 1970
[45] Patented Nov. 23, 1971
[73] Assignee Ricor Ltd.
Kibbutz Ein-Harod, Israel

[54] VACUUM DEVICE INCLUDING VALVE AND SERVICE COUPLING THEREFOR
8 Claims, 3 Drawing Figs.
[52] U.S. Cl. .................................. 137/322,
141/65, 251/65
[51] Int. Cl. ....................................... F16k 15/18
[50] Field of Search ........................... 137/320,
321, 322, 315, 327, 329, 329.01, 329.04; 141/8,
65; 53/79; 251/65

[56] References Cited
UNITED STATES PATENTS
| | | | | |
|---|---|---|---|---|
| 2,756,773 | 7/1956 | Bauerlein | | 251/65 X |
| 3,357,446 | 12/1967 | Simons | | 137/322 |
| 3,561,466 | 2/1971 | Carden | | 251/65 X |

*Primary Examiner*—M. Cary Nelson
*Assistant Examiner*—David R. Matthews
*Attorney*—Benjamin J. Barish ABSTRACT: A vacuum device including a valve and a detachable service coupling having a manipulatable operator for opening and closing the valve, wherein the valve includes a magnet member and the operator includes a movable body carrying a magnet engageable with the magnetic member of the valve for opening and closing the valve. The service coupling includes a housing and a bellows seal disposed therein with its upper end fixed to the housing and its lower end fixed to the movable body of the operator. The operator further includes a stem passing through the bellows seal with the upper end of the stem threaded through the top of the housing and the lower end coupled to the movable body for moving it and the magnet to open and close the valve.

PATENTED NOV 23 1971

3,621,870

Inventors:
MICHA HARCHOL
NACHMAN PUNDAK

By Benjamin J. Barish
Attorney

VACUUM DEVICE INCLUDING VALVE AND SERVICE COUPLING THEREFOR

BACKGROUND OF THE INVENTION

1. Field of the Invention

The invention relates to vacuum devices including a valve and a service coupling therefor, such as are used for evacuating and sealing high-vacuum systems, e.g., cryostats, transfer tubes, and the like.

2. Description of the Prior Art

In the presently known vacuum devices of the foregoing type, the service coupling is usually made detachable from the valve so that it can be removed upon completion of the evacuating operation. This obviates the need for a large permanent valve, and also provides safety against inadvertent opening or tampering, since the valve cannot be opened unless the service coupling is attached. The service coupling includes a manipulatable operator. When the service coupling is applied and it is desired to move the valve in the opening or closing direction, the manipulatable operator is moved so as to effect a mechanical interconnection with the valve, and both are then moved axially to open or close the valve.

A serious drawback in the known vacuum devices utilizing a mechanical interconnection between the operator of the service coupling and the valve, is that the operator must usually be moved axially through a static seal. This is detrimental to the sealing effect, particularly when the operator is moved while the vacuum vessel is under a high vacuum.

SUMMARY OF THE PRESENT INVENTION

The present invention provides a vacuum device of the foregoing type avoiding the above disadvantage, in that the operator of the present invention is not moved through a static seal such as may disturb the vacuum produced.

In the present invention, the coupling between the operator and the valve is not by a mechanical interconnection, but rather by a magnetic coupling. More particularly, the valve includes a magnetic member and the manipulatable operator of the service coupling includes a movable body carrying another magnetic member engageable with the magnetic member of the valve for opening and closing the valve.

According to a preferred construction, the service coupling is detachable from the valve, and includes a housing and a bellows seal disposed therein with its upper end fixed to the housing and its lower end fixed to the movable body. The operator further includes a stem passing axially through the bellows seal with the upper end of the stem protruding through the top of the housing. The lower end of the stem is coupled to the movable body for moving same in one direction to open the valve and in the opposite direction to close the valve.

Further features and advantages of the invention will be apparent from the description below.

BRIEF DESCRIPTION OF THE DRAWINGS

The present invention is herein described, by way of example only, with reference to the accompanying drawings, wherein.

DESCRIPTION OF THE PREFERRED EMBODIMENT

Figure 1:
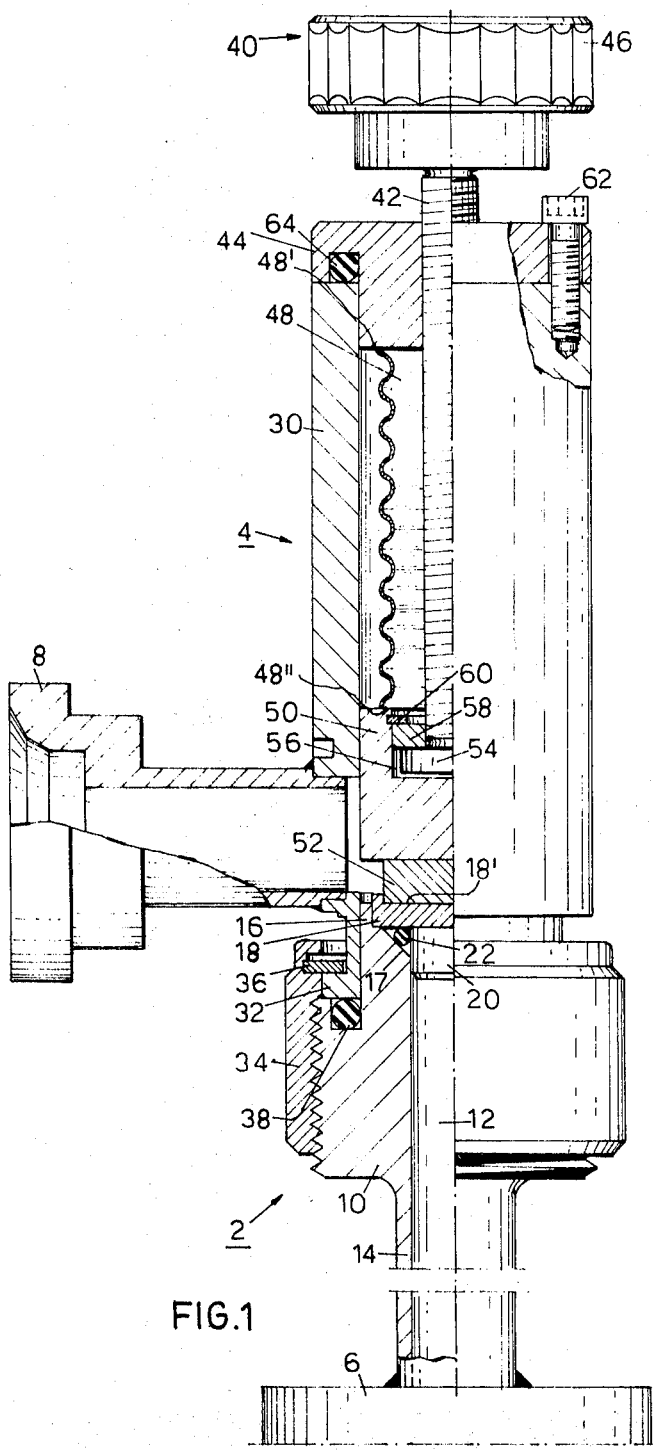
FIG. 1 is an elevational view, partly in section, of a valve and a detachable service coupling therefor constructed in accordance with the invention.

The vacuum device illustrated in FIG. 1 comprises a valve, generally designated 2, and a detachable service coupling therefor, generally designated 4. The outlet end of the valve is attached to the vessel 6 which is to be evacuated, and during the evacuation or pumping-out process, the inlet end of the valve is coupled to the pumping-out device (not shown) through the service coupling. After evacuation, the valve is closed and the service coupling is removed. All this is described fully below particularly with respect to the novel vacuum device of the present invention.

The valve 2 includes a body 10, e.g., of nonmagnetic stainless steel, aluminum or brass, formed with an axial bore 12 communicating with an outlet tube 14 to be attached to the vacuum vessel 6. The inlet (upper) end of the valve includes an annular wall 16 joined to bore 12 by an inwardly tapered wall 17.

Valve member 18 is of disc shape and is formed with a circular recess 18' on its top face. Member 18 is made of magnetic material. It is seatable within annular wall 16 and carries at its underside a depending cylindrical plug 20 seatable within bore 12. Plug 20 may also be made of magnetic material. Preferably both are of magnetic stainless steel. A sealing ring 22 surrounding plug 20 and engageable with the tapered wall 17 of bore 12 completes the seal when the valve is closed.

Service coupling 4 includes a housing 30, e.g. of nonmagnetic stainless steel, attachable to and detachable from valve 2. The lower end 32 of housing 30 is outwardly flanged and is coupled to valve body 10 by means of a threaded nut 34 and a retaining ring 36. A sealing ring 38 is interposed between flange 34 and valve body 10. In the valve, only member 18 (optionally with plug 30) is made of magnetic material.

The service coupling 4 contains a manipulatable operator, generally designated 40, including a stem 42 passing axially through housing 30, with the upper end of the stem protruding through its top wall 44 and carrying a knob 46. Also disposed within housing 30 is a bellows seal 48, the upper end 48' of which is fixed (as by welding) to the top wall of the housing. The lower end 48" of the bellows seal is fixed to a movable cylindrical body 50 which carries at its lower end a disc-shaped permanent magnet 52, the latter being seatable in recess 18' of magnetic member 18 of the valve. Body 50 is preferably made of a nonmagnetic metal such as aluminum or brass, with the magnet 52 fixed to it by welding or by adhesive bonding, but it may also be made of magnetic material as a one-piece unit with magnet 52.

The lower end of the stem 42 carries a disc 54 disposed within a cylindrical recess 56 formed in movable body 50. Also disposed within the latter recess is a bearing ring 58 overlying disc 54 and held in place by an overlying retaining ring 60.

The top wall 44 of housing 30 is in the form of a cover plate removably secured to the housing by fasteners 62, there being a sealing ring 64 interposed between the cover plate and housing.

Stem 42 is threaded through the top wall 44 of the housing so that rotation of the stem in one direction, by manipulating knob 46, will move disc 54 downwardly, and rotating the knob in the opposite direction will move the disc upwardly. Disc 54 serves to couple stem 42 to body 50 and its magnet 52, so that the latter will likewise move upwardly and downwardly with the rotation of knob 46.

The vacuum device illustrated in FIG. 1 is used as follows:

When the vacuum vessel 6 to which valve 2 is attached is to be evacuated, the service coupling 4 is fitted onto valve 2 by tightening nut 34. Knob 46 is then rotated to lower magnet 52 into contact with the magnetic member 18 of the valve, whereupon it seats within recess 18'; this is the position illustrated in FIG. 1. Pumping is then started by the vacuum device (not shown) coupled to connector 8. When the vacuum pressure within connector 8 is lowered to approximate that within vessel 6, knob 46 is slowly rotated to raise disc 54, movable body 50 and magnet 52. Since the pressure on both sides of the disc is almost the same, the holding power of magnet 52 is sufficient to carry with it magnetic disc 18 and plug 20 of the valve, thereby opening the valve and connecting the interior of vessel 6 to the pumping device.

After pumping has been completed, knob 46 is rotated in the opposite direction, to lower magnet 52, magnetic disc 18 and plug 20, thereby closing the valve. The vacuum in connector 8 is then broken by venting the connector to the atmosphere. The upper surface of magnetic disc 18 is thus under atmospheric pressure and its lower surface is under the vacuum of the vessel. The force arising from this pressure differential overcomes the holding power of the magnet 52, so that magnetic disc 18 and plug 20 become tightly seated over bore 12, closing the valve. Knob 46 is then rotated to raise magnet 52. The service coupling 4 is subsequently detached by loosening nut 32.

It will be seen that the operator, when the valve is opened and closed, does not move through a static seal such as would disturb the vacuum produced within vessel 6, as is the case in the known devices briefly described above.

Figure 2:
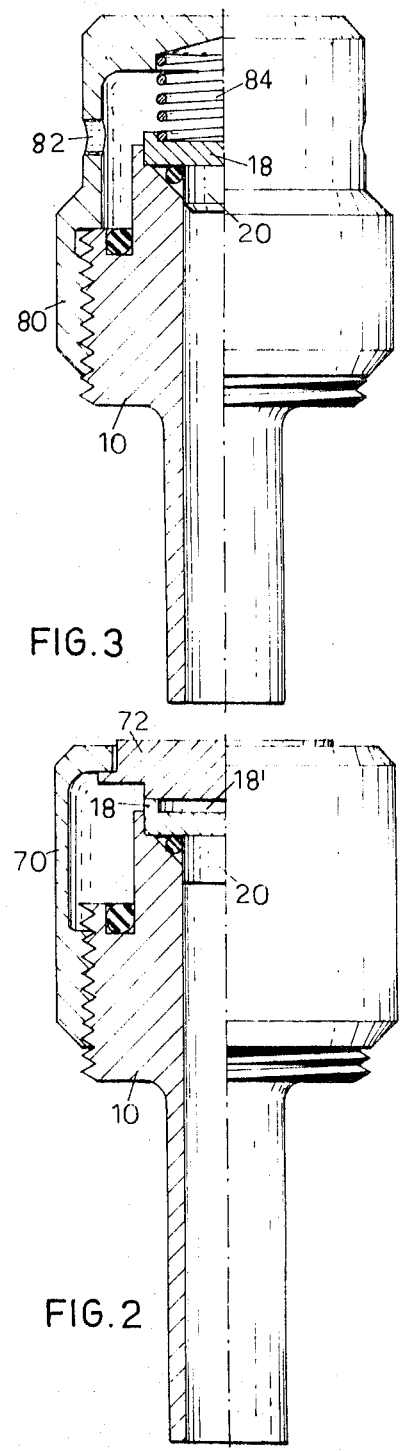
FIG. 2 is a similar view of the valve alone, with the service coupling removed, the valve having a protective cover applied.

After the vessel 6 has been evacuated and the service coupling 4 removed, a protective cover may be attached over the valve for holding same closed. This is shown in FIG. 2, wherein it is seen that protective cover 70 is threaded onto body 10 of the valve. In FIG. 2, the protective cover includes a cap 72 directly bearing against magnetic valve member 18.

Figure 3:
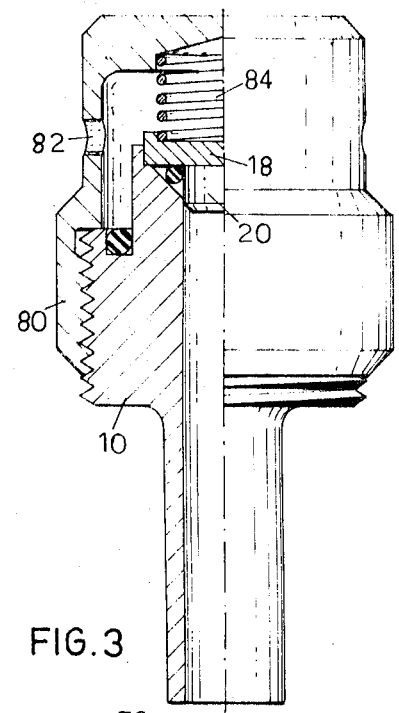
FIG. 3 is a view similar to that of FIG. 2, but including a pressure-relief spring for opening of the valve should there be an accidental pressurization of the vacuum vessel.

On equipment where accidental pressurization of the vacuum space can occur, a spring-loaded vented cover may be fitted to the valve, thus converting it to a safety valve. This is shown in FIG. 3, wherein it is seen that protective cover 80 is formed with a port 82 for venting its interior to the atmosphere. It is threaded onto valve body 10 and includes a pressure-release spring 84 interposed between the cover and magnetic valve member 18. In case of an accidental pressure rise above atmospheric pressure within the vacuum space, the valve is automatically opened against spring 84, thereby venting the vacuum space to the atmosphere through port 82.

It will be appreciated that permanent magnet 52 could be of soft magnetic material and valve member of permanent magnetic material, or both could be of permanent magnetic material magnetized in opposite senses so as to attract one another. Also, magnet 52 may be an electromagnet, and further, it may be disposed outside the housing.

Many other variations and application of the illustrated embodiment will be apparent.

What is claimed is:

1. A vacuum device including a valve and a service coupling therefor, the service coupling having a manipulatable operator for opening and closing the valve, the improvement wherein said valve includes a magnetic member and the operator includes a movable body carrying a magnetic member engageable with the magnetic member of said valve for opening and closing the valve.

2. A vacuum device according to claim 1, wherein said service coupling is attachable to and detachable from the valve.

3. A vacuum device according to claim 2, wherein said service coupling includes a housing, a bellows seal disposed within the housing with its upper end fixed to the housing and its lower end fixed to said movable body, said operator further including a stem passing axially through said bellows seal with the upper end of the stem protruding through the top of the housing, the lower end of said stem being coupled to said movable body for moving same in one direction to open the valve and in the opposite direction to close the valve.

4. A vacuum device according to claim 3, wherein the lower end of said stem is coupled to said movable body by a disc fixed to the lower end of the stem, the upper end of said movable body being formed with a cylindrical recess in which said disc is disposed, said movable body further carrying a retainer ring disposed at the upper end of said cylindrical recess and overlying said disc.

5. A vacuum device according to claim 3, wherein said stem is threaded through the top of said housing and carries a knob at its upper end, said stem being movable axially in either direction by rotating said knob in one or the other direction.

6. A vacuum device according to claim 2, further including a protective cover attachable over the valve for holding same closed when the service coupling is detached therefrom.

7. A vacuum device according to claim 6, wherein said protective cover includes a cap directly bearing against said magnetic member of the valve when the cover is attached.

8. A vacuum device according to claim 6, further including a pressure-relief spring interposed between the protective cover and the magnetic member of the valve when the protective cover is attached, said protective cover further including a port for venting the interior thereof to the atmosphere.

* * * * *